United States Patent
Kurono et al.

(10) Patent No.: US 8,093,791 B2
(45) Date of Patent: Jan. 10, 2012

(54) SPARK PLUG HAVING PARTICULAR INSULATOR

(75) Inventors: Hirokazu Kurono, Nagoya (JP); Toshitaka Honda, Nagoya (JP); Hiroki Takeuchi, Aichi (JP); Takeshi Mitsuoka, Kounan (JP); Kuniharu Tanaka, Komaki (JP); Katsuya Takaoka, Komaki (JP)

(73) Assignee: NGK Spark Plug Co., Ltd., Aichi (JP)

( * ) Notice: Subject to any disclaimer, the term of this patent is extended or adjusted under 35 U.S.C. 154(b) by 254 days.

(21) Appl. No.: 12/598,459

(22) PCT Filed: Mar. 26, 2009

(86) PCT No.: PCT/JP2009/001358
§ 371 (c)(1),
(2), (4) Date: Nov. 2, 2009

(87) PCT Pub. No.: WO2009/119097
PCT Pub. Date: Oct. 1, 2009

(65) Prior Publication Data
US 2010/0084960 A1    Apr. 8, 2010

(30) Foreign Application Priority Data

Mar. 27, 2008 (JP) ................. 2008-084437

(51) Int. Cl.
*H01T 13/20* (2006.01)
(52) U.S. Cl. .................. 313/143; 313/118
(58) Field of Classification Search ............ 313/143, 313/118, 141; 501/127
See application file for complete search history.

(56) References Cited

U.S. PATENT DOCUMENTS

| | | | |
|---|---|---|---|
| 5,424,257 A * | 6/1995 | Schat et al. | 501/127 |
| 5,760,532 A * | 6/1998 | Makoto et al. | 313/130 |
| 6,559,579 B2 * | 5/2003 | Ito et al. | 313/143 |
| 2006/0186780 A1 | 8/2006 | Ogata et al. | |
| 2010/0136867 A1 * | 6/2010 | Kurono et al. | 445/7 |

FOREIGN PATENT DOCUMENTS

| | | |
|---|---|---|
| EP | 1005125 A2 | 5/2000 |
| JP | 7-012969 B2 | 2/1995 |
| JP | 2000-272957 A | 10/2000 |
| JP | 2001-002464 A | 1/2001 |
| JP | 2001-313148 A | 11/2001 |
| JP | 2001-335360 A | 12/2001 |
| WO | 2005/033041 A1 | 4/2005 |

* cited by examiner

*Primary Examiner* — Karabi Guharay
(74) *Attorney, Agent, or Firm* — Sughrue Mion, PLLC

(57) ABSTRACT

An object of the invention is to provide a spark plug including an insulator which is difficult to cause breakdown and exhibits higher withstand voltage characteristics. This invention relates to a spark plug 1 including a center electrode 2, an insulator 3 and a grounding electrode 6, wherein the insulator is formed by an alumina-based sintered body which has a theoretical density ratio of 95.0% or more, which contains a rare earth element component, Si component, and at least two kinds of Group 2 element (2A) components, and in which the rare earth element being dispersed so as to satisfy the following condition: <Condition> when 7 places of measurement line (measurement length: 180 μm) are selected in the alumina-based sintered body and the rare earth element (RE) present in each of selected measurement lines is analyzed with an energy dispersion method, a total number of measurement lines in which 8 or more peaks derived from the rare earth element (RE) are observed is 4 places or more of the 7 places.

5 Claims, 3 Drawing Sheets

(a)

REAR END DIRECTION

FRONT END DIRECTION (b)

FRONT END DIRECTION

REAR END DIRECTION

US 8,093,791 B2

SPARK PLUG HAVING PARTICULAR INSULATOR

TECHNICAL FIELD

This invention relates to a spark plug. More particularly, the invention relates to a spark plug including an insulator, which is difficult to cause breakdown and exhibits higher withstand voltage characteristics.

BACKGROUND ART

Conventionally, a spark plug used in internal combustion engines such as automotive engines includes an insulator for a spark plug (hereinafter also referred to as simply an "insulator") formed by an alumina-based sintered body obtained by burning an alumina ($Al_2O_3$) type material. The reason why the insulator is formed by an alumina-based sintered body is that the alumina-based sintered body has excellent heat resistance, mechanical strength and withstand voltage characteristics. For burning an alumina-based sintered body, for example, a three-component system sintering aid comprising silicon oxide ($SiO_2$), calcium monoxide (CaO) and magnesium monoxide (MgO) is generally used for the purpose of lowering of a burning temperature and improvement of sinterability.

An insulator is exposed to hot atmosphere of about 500 to 700° C. by the influence of high temperature combustion gas (about 2,000 to 3,000° C.) generated by spark discharge in a combustion chamber of internal combustion engine. For this reason, it is important for an insulator to have excellent withstand voltage characteristics in a range of from room temperature to the above high temperature. In particular, in recent years, increase in occupation space of inlet and exhaust valves in a combustion chamber and 4-valve formation are investigated with increase in power of internal combustion engines, and a spark plug itself tends to be down-sized (small diameter). For this reason, an insulator is required to decrease its thickness, and an insulator having further excellent withstand voltage characteristics even when exposed to hot atmosphere of about 500 to 700° C. is required.

However, in the case of forming an alumina-based sintered body using the three-component system sintering aid described above, the three-component system sintering aid (mainly Si component) is present as a low melting point glass phase in grain boundary of alumina crystal particles after sintering. Therefore, when an insulator formed by an alumina-based sintered body is exposed to hot atmosphere of about 700° C., the low melting point glass phase softens by the influence of the temperature, and withstanding voltage characteristics of the insulator are decreased. On the other hand, a low melting point glass phase in an alumina-based sintered body can be decreased by decreasing the amount of the sintering aid added. In this case, an insulator is not densified, or even though densified seemingly, many pores remain in grain boundary constituted by alumina crystal particles, and withstanding voltage characteristics of the insulator are decreased.

The conventional alumina-based sintered body has a low melting glass phase or pores (residual pores) present in grain boundary. In the case of forming an insulator of a spark plug with such an alumina-based sintered body, when high voltage for generating spark discharge is applied to a spark plug in high temperature environment of about 700° C., a low melting point glass phase softens, or electric field concentrates in residual pores, and an insulator may suffer breakdown (spark penetration).

An alumina-based sintered body containing rare earth metals, an insulator formed by the alumina-based sintered body, and the like are proposed for the purpose of preventing decrease in withstand voltage characteristics and/or breakdown. For example, Patent Document 1 describes "an alumina-based sintered body containing at least a rare earth element (hereinafter referred to as "RE") component, the alumina-based sintered body having a theoretical density ratio of 95% or more."

Patent Document 2 describes "an alumina porcelain composition using alumina as a main component, comprising a composite sintered body of the alumina as the main component, and a composition of at least one element selected from Al, Si, Mg and rare earth elements, wherein when the amount of alumina as the main component is 100 parts by weight, the amount of the composition of at least one element selected from Al, Si, Mg and rare earth elements is 5 parts by weight or less."

Patent Document 3 describes "an alumina porcelain constituted of a sintered body having a porosity of 6% by volume or less, the sintered body comprising alumina ($Al_2O_3$) having an average particle diameter of 1 µm or less in a sintered composition, and at least one of compound and mixture of at least one of yttria ($Y_2O_3$), magnesia (MgO), zirconia ($ZrO_2$) and lanthanum oxide ($La_2O_3$), formed in grain boundary and $Al_2O_3$."

However, an insulator is required to have higher withstand voltage characteristics and prevention of breakdown because of the reason why internal combustion engines have high power than ever.

Patent Document 1: JP-A-2001-2464
Patent Document 2: WO05/033041 pamphlet
Patent Document 3: JP-B-7-12969 (1995)

DISCLOSURE OF THE INVENTION

Problem to be Solved by the Invention

This invention has an object to provide a spark plug including an insulator which is difficult to cause breakdown and exhibits higher withstand voltage characteristics.

Means for Solving the Problem

The present inventors have found the following fact and have completed this invention. In a dense alumina-based sintered body containing Si component and a Group 2 element (2A) component in the periodic table based on the recommendation of IUPAC 1990, when the Group 2 element (2A) component contains Mg and Ba as the essential components and further contains at least other one element excluding Mg and Ba, and an rare earth element (RE) component is contained and dispersed so as to satisfy the conditions described hereinafter, withstand voltage characteristics that an insulator formed by the conventional alumina-based sintered body containing rare earth element and the like can further be improved up to higher level, and even though thickness of an insulator formed by the alumina-based sintered body is decreased and the insulator is used in internal combustion engines having high power, the insulator is highly difficult to cause breakdown, and exhibits higher withstand voltage characteristics even at high temperature of 500 to 700° C.

The present invention as a means for solving the problem provides a spark plug comprising: a center electrode; a substantially cylindrical insulator provided on a periphery of the center electrode; and a grounding electrode provided such that one end thereof faces the center electrode through a spark discharge gap, wherein the insulator is formed by an alumina-based sintered body which has a theoretical density ratio of 95.0% or more, which contains a rare earth element (RE) component, Si component, and a Group 2 element (2A) component containing Mg and Ba as essential components and further containing at least other one element excluding Mg and Ba in Group 2 elements in a periodic table based on the recommendation of IUPAC 1990, and in which the rare earth element (RE) is dispersed so as to satisfy the condition described below:

<Condition> when 7 places of measurement line (measurement length: 180 μm) are selected in the alumina-based sintered body and the rare earth element (RE) present in each of selected measurement lines is analyzed with an energy dispersion method, a total number of measurement lines in which 8 or more peaks derived from the rare earth element (RE) are observed is 4 places or more of the 7 places.

Advantage of the Invention

The alumina-based sintered body forming an insulator of the spark plug according to this invention is an alumina-based sintered body which has a theoretical density ratio of 95.0% or more, which contains a rare earth element (RE) component, Si component, and a Group 2 element (2A) component containing Mg and Ba as essential components and further containing at least other one element excluding Mg and Ba in Group 2 elements in the periodic table based on the recommendation of IUPAC 1990, and in which the rare earth element (RE) component being dispersed so as to satisfy the condition described above. Therefore, the rare earth element (RE) component is uniformed dispersed, and collaborates with the Si component and the Group 2 element (2A) component, thereby effectively preventing formation of a low melting point glass phase to grain boundary and retention of pores in grain boundary. An insulator formed by the alumina-based sintered body is highly difficult to cause breakdown even though its thickness is decreased and the insulator is used for internal combustion engines having high power, and can exhibit higher withstand voltage characteristics even at high temperature of 500 to 700° C. Therefore, according to this invention, a spark plug including an insulator which is difficult to cause breakdown and exhibits higher withstand voltage characteristics can be provided.

BRIEF DESCRIPTION OF DRAWINGS

FIG. 1 is an explanatory view explaining a spark plug as one example of the spark plug according to this invention, in which FIG. 1(a) is a whole explanatory view of a partial cross section of a spark plug as one example of the spark plug according to this invention, and FIG. 1(b) is an explanatory view of cross section showing a main part of a spark plug as one example of the spark plug according to this invention.

| DESCRIPTION OF REFERENCE SIGNS | |
| --- | --- |
| 1: | Spark plug |
| 2: | Center electrode |
| 3: | Insulator |
| 4: | Metal shell |
| 5: | Noble metal tip |
| 6: | Grounding electrode |
| 7: | Outer member |
| 8: | Inner member |
| 9: | Screw portion |
| G: | Spark discharge gap |
| 20: | Withstand voltage measuring device |
| 21: | Disc-shaped test piece |
| 22: | Heating box |
| 23a, 23b: | Electrode |
| 24a, 24b, 28a, 28b: | Alumina-made insulator cylinder |
| 25: | Sealing glass |
| 26: | Electric heater |
| 27: | High voltage generating apparatus (CDI power source) |

BEST MODE FOR CARRYING OUT THE INVENTION

The spark plug according to this invention includes a center electrode, a substantially cylindrical insulator provided on the periphery of the center electrode, and a grounding electrode provided such that one end thereof faces the center electrode through a spark discharge gap. The spark plug according to this invention is not particularly limited in other constitution so long as the spark plug has such a constitution, and can have the conventional various constitutions.

Figure 1:
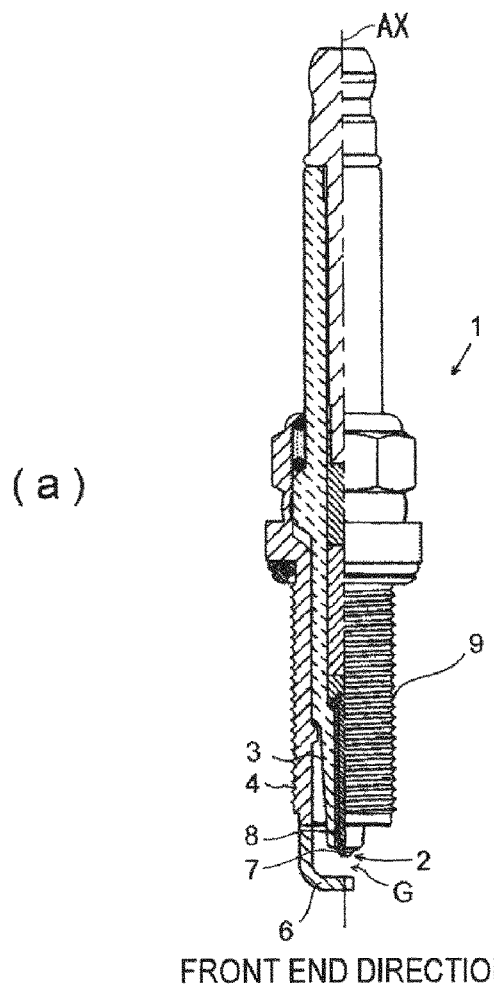
Figure 1:
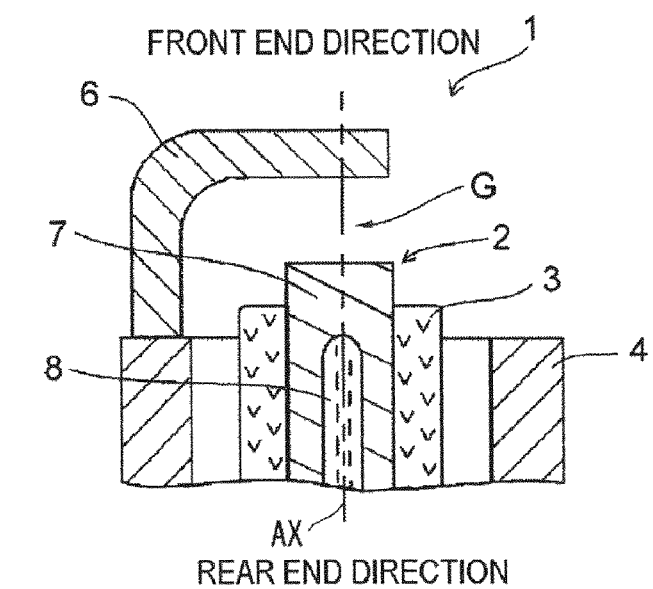

A spark plug as one example of the spark plug according to this invention is shown in FIG. 1. FIG. 1(a) is a whole explanatory view of a partial cross section of a spark plug 1 as one example of the spark plug according to this invention, and FIG. 1(b) is an explanatory view of a cross section showing a main part a spark plug 1 as one example of the spark plug according to this invention. FIG. 1(a) is explained as that the downside on paper is a front end direction of an axis line AX, and the upside on paper is a rear end direction of an axis line AX, and FIG. 1(b) is explained as that the upside on paper is a front end direction of an axis line AX, and the downside on paper is the rear end direction of the axis line AX.

As shown in FIG. 1(a) and FIG. 1(b), the spark plug 1 includes a substantially rod-shaped center electrode 2, a substantially cylindrical insulator 3 provided on the periphery of the center electrode 2, a cylindrical metal shell 4 holding the insulator 3, and a grounding electrode 6 provided such that one end thereof faces a front end surface of the center electrode 2 through a spark discharge gap other end thereof being joined to an end surface of the metal shell 4.

The metal shell 4 has a cylindrical shape, and is formed so as to hold the insulator 3 by housing the insulator 3 therein. A screw portion 9 is formed on the periphery in a front end direction of the metal shell 4, and the spark plug 1 is mounted on a cylinder head of an internal combustion engine not shown by utilizing the screw portion 9. In the case that the spark plug 1 is mounted on a recent internal combustion engine having high power, a nominal diameter of the screw portion is adjusted to, for example, 10 mm or less. The metal shell 4 can be formed by a conductive iron steel material such as low carbon steel.

The center electrode 2 is formed by an outer member 7 and an inner member 8 formed so as to be concentrically embedded in an axial core portion inside the outer member 7. The center electrode 2 is fixed to an axis hole of the insulator 3 in a state that its front end portion is projected from a front end surface of the insulator 3, and is insulated and held to the metal shell 4. The outer member 7 of the center electrode 2 can be formed by Ni-based alloy having excellent heat resistance and corrosion resistance. The inner member 8 of the center electrode 2 can be formed by a metal material having excellent thermal conductivity such as copper (Cu) or silver (Ag).

The grounding electrode 6 is formed into, for example, a prismatic body, and one end thereof is joined to the end surface of the metal shell 4. The grounding electrode 6 is bent into substantially L-shape in the middle thereof, and the shape and structure of the grounding electrode 6 are designed such that the front end portion thereof is positioned in an AX direction of axis line of the center electrode 2. When the grounding electrode 6 is designed like this, the grounding electrode 6 is arranged such that one end thereof faces the center electrode 2 through the spark discharge gap G. The spark discharge gap G is a gap between the front end surface of the center electrode 2 and the surface of the grounding electrode 6, and the spark discharge gap G is generally set to 0.3 to 1.5 mm. The grounding electrode 6 is exposed to higher temperature than the center electrode 2. Therefore, the grounding electrode 6 is preferably formed by, for example, Ni-based alloy having further excellent heat resistance and corrosion resistance than those of Ni-based alloy forming the center electrode 2.

The insulator 3 is held on the inner peripheral portion of the metal shell 4 through talc and/or packing (not shown), and has an axis hole holding the center electrode 2 along an AX direction of axis line of the insulator 3. The insulator 3 is fixed to the metal shell 4 in a state that the end in the front end direction of the insulator 3 is projected from the front end surface of the metal shell 4. In the case that the nominal diameter of the screw portion 9 in the metal shell 4 is adjusted to 10 mm or less, the insulator 3 in the front end surface of the metal shell 4 is set to a thickness of, for example, 0.7 to 1.0 mm.

In the spark plug 1, the insulator 3 is formed by the following alumina-based sintered body. The alumina-based sintered body forming the insulator 3 is an alumina-based sintered body which has a theoretical density ratio of 95.0% or more, which contains a rare earth element (RE) component, Si component, and a Group 2 element (2A) component containing Mg and Ba as essential components and further containing at least other one element excluding Mg and Ba in Group 2 elements in the periodic table based on the recommendation of IUPAC 1990, and in which the rare earth element (RE) is dispersed so as to satisfy the condition described below. That is, the insulator 3 of the spark plug 1 contains a rare earth element (RE) component, Si component, and a Group 2 element (2A) component containing Mg and Ba as essential components and further containing at least other one element excluding Mg and Ba in Group 2 elements in the periodic table based on the recommendation of IUPAC 1990, the rare earth element (RE) being dispersed so as to satisfy the condition described below, and has a theoretical density ratio of 95.0% or more.

<Conditions> When 7 places of measurement line (measurement length: 180 μm) are selected in the alumina-based sintered body and the rare earth element (RE) present in each of selected measurement lines is analyzed with an energy dispersion method, the total number of measurement lines in which 8 or more peaks derived from the rare earth element (RE) are observed is 4 places or more of the 7 places.

The alumina-based sintered body contains Al component, mainly alumina ($Al_2O_3$), as the main component. The term "main component" in this invention means a component having the highest content. When the Al component is contained as the main component, withstand voltage characteristics, heat resistance and mechanical properties of the sintered body are excellent.

The content of the Al component in the alumina-based sintered body is preferably from 92.5 mass % to 97.0 mass %, and particularly preferably from 93.0 mass % to 95.5 mass %, when the whole mass of the alumina-based sintered body is defined as 100 mass %. When the content of the Al component is fallen with the above range, the content of a sintering aid in a raw material powder before sintering for the formation of the alumina-based sintered body becomes an appropriate proportion, and therefore, the alumina-based sintered body obtained by sintering the raw material powder before sintering is dense. As a result, when the content of the Al component is fallen within the above range, formation of a low melting point glass phase and retention of pores are less in grain boundary, and an insulator formed by the alumina-based sintered body is difficult to cause breakdown and exhibits high withstand voltage characteristics. In this invention, the content of the Al component is defined as mass % in terms of an oxide when converted to "alumina ($Al_2O_3$)" which is an oxide of the Al component.

In the alumina-based sintered body, crystal particles of alumina present as the Al component have an average crystal particle diameter $D_A(Al)$ of, for example, 1.5 to 4.5 μm. The crystal particles of alumina in the alumina-based sintered body are shown by "deep color region" in an image analysis photograph as described hereinafter. The average crystal particle diameter $D_A(Al)$ of the crystal particles in the alumina-based sintered body can be obtained by observation with a scanning electron microscope (SEM) similar to a crystal particle size $D_E(RE)$ of RE-β-alumina crystal phase described hereinafter. Specifically, $D_A(Al)$ is calculated as follows. A surface or an optional cross section of an alumina-based sintered body is mirror-polished. The mirror-polished surface is subjected to a thermal etching treatment at a temperature 100° C. lower than the burning temperature of the alumina-based sintered body for 10 minutes. The treated surface is observed with a scanning electron microscope (SEM). Particle diameters of "deep color regions" represented by "binarization" described hereinafter are measured with an intercept method. Those values are subjected to arithmetic average.

The alumina-based sintered body contains a component derived from a sintering aid, that is, a rare earth element (RE) component, Si component, and a Group 2 element (2A) component containing Mg and Ba as essential components and further containing at least other one element excluding Mg and Ba in Group 2 elements in the periodic table based on the recommendation of IUPAC 1990. The total content of those components in the alumina-based sintered body is preferably from 3.0 mass % to 7.5 mass %, and particularly preferably from 4.5 mass % to 7.0 mass %, when the whole mass of the alumina-based sintered body is defined as 100 mass %. When the total content of those components is fallen with the above range, an insulator formed by the alumina-based sintered body is difficult to cause breakdown and exhibits high withstand voltage characteristics.

The alumina-based sintered body contains a rare earth element (RE) component derived from a sintering aid, such as an oxide of a rare earth element and an ion of a rare earth element. The rare earth element (RE) component is a component containing Sc, Y and lanthanoid element, and is specifically Sc component, Y component, La component, Ce component, Pr component, Nd component, Pm component, Sm component, Eu component, Gd component, Tb component, Dy component, Ho component, Er component, Tm component, Yb component and Lu component. When the rare earth element (RE) component is contained at the sintering, the component suppresses particle growth of alumina from being excessively generated at the sintering, and additionally, forms RE-Si system glass (rare earth glass) in grain boundary, thereby increasing a melting point of grain boundary glass phase. When the insulator 3 is formed, withstand voltage characteristics are improved, and additionally, mechanical strength in high temperature environment is improved. In particular, the alumina-based sintered body contains the rare earth element (RE) component dispersed so as to satisfy the condition described before. Therefore, the rare earth element (RE) component is uniformly dispersed, and collaborates with the Si component and the Group 2 element (2A) component to effectively prevent formation of low melting point glass phase to grain boundary and retention of pores in grain boundary. As a result, the alumina-based sintered body exhibits higher withstand voltage characteristics at high temperature of 500 to 700° C.

The rare earth element (RE) component can be each component described before, but is preferably at least one component selected from the group consisting of La component, Pr component, Nd component and Sm component. It is considered that La component, Pr component, Nd component and Sm component have a large ion radius of each element of La, Pr, Nd and Sm, forms crystal phase having high melting point coupled with Si component, and additionally, easily forms crystal phase of RE-β-alumina structure (hereinafter simply referred to as "RE-β-alumina crystal phase") having very high melting point of about 2,000° C. coupled with the Al component and as the case may be, with the Group 2 element (2A) component. Therefore, when at least one component selected from the group consisting of La component, Pr component, Nd component and Sm component is contained as the rare earth element (RE) component, the RE-β-alumina crystal phase is formed, and as a result, withstand voltage characteristics and mechanical strength in high temperature environment can further be improved when forming the insulator 3.

Therefore, the RE-β-alumina crystal phase preferably has a composition represented by a compositional formula: $RE(2A)_x(Al)_yO_z$ (wherein x, y and z are x=0 to 2.5, y=11 to 16, and z=18 to 28, respectively). In the case of containing at least one component selected from the group consisting of La component, Pr component, Nd component and Sm component as the rare earth element (RE) component, the RE-β-alumina crystal phase particularly preferably has a composition represented by the above compositional formula. When the RE-β-alumina crystal phase has a composition represented by the above compositional formula, withstand voltage characteristics and mechanical strength in high temperature environment can further be improved when forming the insulator 3. Therefore, in this invention, when the RE-β-alumina crystal phase has a composition represented by the above compositional formula, the object can be achieved to provide a spark plug including an insulator which is difficult to cause breakdown and exhibits higher withstand voltage characteristics and mechanical strength in high temperature environment. The x, y and z in the above compositional formula can be an integer and a decimal, within above each range. The x, y and z are preferably selected such that x is a range of from 0 to 1.5, y is a range of from 11 to 14, and z is a range of from 18 to 24. The compositional formula showing the composition of the RE-β-alumina crystal phase may be, for example, $RE(2A)Al_{13}O_{19}$, $REAl_{11}O_{18}$, etc.

Whether or not the RE-β-alumina crystal phase has a composition satisfying the compositional formula can be confirmed by, for example, subjecting the RE-β-alumina crystal phase present in the alumina-based sintered body to elemental analysis using energy dispersion X-ray analyzer (EDX) (EDX: Genesis 400, manufactured by EDAX, detector: SUTW 3.3R TEM) provided with transmission electron microscope (TEM) (HD-2000, manufactured by Hitachi, Ltd.) under the following measurement conditions.

<Measurement Conditions>

(1) Accelerating voltage: 200 kV (2) Irradiation mode: HR (spot size: about 0.3 nm)

(3) Measurement result of energy dispersion X-ray analyzer (EDX) is calculated mass % in terms of oxide. Oxides other than Group 2 element (2A) component, rare earth element (RE) component and Al component, and having 1 mass % in terms of oxide or less are considered impurities. The total mol number of Group 2 element (2A) component is x, the total mol number of Al component is y, and mol number of theoretical oxygen component in the oxygen defect-free case is z when mol number of the rare earth element (RE) component is 1.

The RE-β-alumina crystal phase is sufficient to be present in the alumina-based crystal phase, and the site of presence thereof is not particularly limited. The RE-β-alumina crystal phase is preferably present up to the inside of the alumina-based sintered body, and is particularly preferably present in secondary particle grain boundary and/or triple point of alumina crystal particles.

The presence of the RE-β-alumina crystal phase can be identified with, for example, X-ray diffraction using JCPDS card. Regarding Pr component, Nd component and Sm component, JCPDS card of RE-β-alumina is not present. Therefore, direct identification with X-ray diffraction is impossible. However, ion radii of $Pr^{3+}$, $Nd^{3+}$ and $Sm^{3+}$ are substantially equal to ion radius of $La^{3+}$, and therefore show X-ray diffraction spectrum similar to JCPDS card (No. 33-699) of La-β-alumina. Therefore, the presence of Pr-β-alumina, Nd-β-alumina and Sm-β-alumina can be confirmed by comparing with JCPDS card of La-β-alumina.

When the RE-β-alumina crystal phase has too large particle diameter when the RE-β-alumina crystal phase present in the alumina-based sintered body is considered as a granular crystal particle, the RE-β-alumina crystal phase has the possibility to decrease mechanical strength in high temperature environment. Therefore, to exhibit higher mechanical strength in high temperature environment when forming the insulator 3, a particle diameter of the RE-β-alumina crystal phase is appropriately adjusted.

For example, in this invention, it is preferred that the average crystal particle diameter $D_A(RE)$ of the RE-β-alumina crystal phase and the average crystal particle diameter $D_A(Al)$ of alumina are satisfied with the following condition (1), and it is particularly preferred that those diameters are satisfied with the following condition (1) in the case that the rare earth element (RE) component is at least one component selected from the group consisting of La component, Pr component, Nd component and Sm component. When those diameters are satisfied with the following condition (1), the alumina-based sintered body can exhibit higher mechanical strength in high temperature environment without decreasing withstand voltage characteristics. Therefore, in this invention, when the alumina-based sintered body is satisfied with the following condition (1), the object can be achieved to provide a spark plug including an insulator which is difficult to cause breakdown and exhibits higher withstand voltage characteristics and higher mechanical strength in high temperature environment. In the following condition (1), $D_A(RE)/D_A(Al)$ is preferably 0.2 to 2, and particularly preferably 0.2 to 1.5.

$$0.2 \leq D_A(RE)/D_A(Al) \leq 3.0 \qquad \text{Condition (1)}$$

In this invention, it is preferred that of the RE-β-alumina crystal phases contained in the alumina-based sintered body, RE-β-alumina crystal phases in which its crystal particle diameter $D_E(RE)$ and the average crystal particle diameter $D_A(Al)$ of alumina are satisfied with the following condition (2) are 3 or less, and it is particularly preferred that RE-β-alumina crystal phases satisfying the following condition (2) in the case that the rare earth element (RE) component is at least one component selected from the group consisting of La component, Pr component, Nd component and Sm component, are 3 or less. When the RE-β-alumina crystal phases satisfying the following condition (2) are 3 or less, the alumina-based sintered body can exhibit higher mechanical strength in high temperature environment without decreasing withstand voltage characteristics. Therefore, in this invention, when the alumina-based sintered body is satisfied with the following condition (2), the object can be achieved to provide a spark plug including an insulator which is difficult to cause breakdown and exhibits higher withstand voltage characteristics and higher mechanical strength in high temperature environment. The RE-β-alumina crystal phases satisfying the following condition (2) are preferably 2 or less, and particularly preferably 1 or less.

$$D_E(RE)/D_A(Al) \geq 2 \qquad \text{Condition (2)}$$

The crystal particle diameter $D_E(RE)$ and the average crystal particle diameter $D_A(RE)$ can be obtained as follows. For example, a surface or an optional cross-section of an alumina-based sintered body is mirror-polished. The mirror-polished surface is subjected to a thermal etching treatment at a temperature 100° C. lower than the burning temperature of the alumina-based sintered body for 10 minutes. The treated surface is observed with a scanning electron microscope (SEM), and the observation region is photographed at 2,000-fold magnification. When the image obtained is subjected to binarization process (alternatively called two-tone process) under the following binarization process and conditions using an image analysis software WinROOF (manufactured by Mitani Corporation), the RE-β-alumina crystal phase is shown as "light color region", and alumina is shown as "deep color region". The crystal particle diameter $D_E(RE)$ of the RE-β-alumina crystal phase is a value obtained by that, assuming that the "light color region" extracted by the binarization process is crystal particle of one RE-β-alumina crystal phase, a surface area of each "light color region" is calculated, and a diameter corresponding to a circle of each "light color region" is calculated from the surface area. The average crystal particle diameter $D_A(RE)$ of the RE-β-alumina crystal phase is an arithmetic average value of the crystal particle diameter $D_E(RE)$ thus calculated.

<Binarization Process and Condition>

(1) On the image (horizontal 1280 pixel and vertical 1024 pixel) obtained by photographing the treated surface, secondary electron image and reflected electron image are confirmed. In the case that "light color aggregated region" comprising aggregate of 2 or more "light color regions" or 2 or more adjacent "light color regions" is present in the reflected electron image, a line is drawn on the boundary (corresponding to grain boundary of each crystal) in each "light color region", and the boundary of each "light color region" is clarified.

(2) To improve an image of the reflected electron image, the image of the reflected electron image is smoothened while maintaining the edge of the "light color region".

(3) "Threshold" in the binarization process for extracting only "light color region" from the reflected electron image is set. More specifically, a graph having a horizontal axis of brightness and a vertical axis of frequency is prepared from the image of the reflected electron image.

(4) The extraction of the "light color region" is conducted by selecting an optional region (horizontal 40 μm and vertical 30 μm) in the reflected electron image and extracting the "light color region" present in the image of the region.

(5) To improve image quality of the region selected, that is, the "light color region" extracted, treatment for filling holes appeared on the region selected is conducted.

(6) In the image of the region selected, the "light color region" having a diameter of 10 pixel or less is removed.

(7) Thus, each "light color region" is extracted.

The range of the average crystal particle diameter $D_A(RE)$ of the RE-β-alumina crystal phase is not particularly limited so long as the condition (1) is satisfied or the RE-β-alumina crystal phases satisfying the condition (2) are 3 or less. The average crystal particle diameter $D_A(RE)$ is preferably 0.5 to 4.5 μm, and particularly preferably 0.7 to 4.0 μm. When the RE-β-alumina crystal phase has the average crystal particle diameter $D_A(RE)$ in the above range, when forming the insulator 3, withstand voltage characteristics and mechanical strength in high temperature environment can be achieved in combination in a high level.

The RE-β-alumina crystal phase can use RE-β-alumina itself as a raw material powder. However, anisotropic growth of the RE-β-alumina particles is remarkable at the sintering, and as a result, densification of the alumina-based sintered body may be impaired. Therefore, the RE-β-alumina crystal phase is preferably precipitated and formed in the course of burning. For example, the RE-β-alumina crystal phase can be precipitated and formed by sintering a raw material powder containing the Si component and the Group 2 element (2A) component in the respective contents described above in the presence of the rare earth element (RE) component.

To precipitate the RE-β-alumina crystal phase satisfying the condition (1) and/or 3 or less RE-β-alumina crystal phases satisfying the condition (2), when, for example, the content of the rare earth element (RE) component is adjusted, more specifically, the content of the rare earth element (RE) component is decreased, both "$D_A(RE)/D_A(Al)$" of the condition (1) and "the number of the RE-β-alumina crystal phase satisfying $D_E(RE)/D_A(Al) \geq 2$" of the condition (2)" become small or are decreased.

The content of the rare earth element (RE) component in the alumina-based sintered body is adjusted to a range which does not exceed the total content of the sintering aid. In the case that the rare earth element (RE) component is, for example, La component, Pr component, Nd component or Sm component, the content of the rare earth element (RE) component is adjusted to the content of an extent capable of forming the RE-β-alumina crystal phase. Specifically, when the whole mass of the alumina-based sintered body is defined as 100 mass %, the content of the rare earth element (RE) component is preferably 0.2 to 4.0 mass %, and particularly preferably 0.5 to 2.5 mass %, regardless of the rare earth element (RE) component being La component, Pr component, Nd component or Sm component. When the content of the rare earth element (RE) component is fallen within the above range, the rare earth element (RE) component is uniformly dispersed, and withstand voltage characteristics when forming the insulator 3 can greatly be improved.

In this invention, the content R of the rare earth element (RE) component in the alumina-based sintered body is defined as mass % in terms of oxide when converted into an oxide of each component. Specifically, the Pr component is defined as mass % in terms of oxide when converted to "$Pr_6O_{11}$", and the rare earth element (RE) component other than the Pr component is defined as mass % in terms of oxide when converted to "$RE_2O_3$". When plural rare earth element (RE) components are contained, the content is the total content of the content of each component.

The alumina-based sintered body contains Si component derived from a sintered aid, for example, Si oxide and Si ion. The Si component generally melts at the sintering to form liquid phase and functions as a sintering aid promoting densification of a sintered body. After sintering, the alumina-based sintering body forms low melting point glass phase in grain boundary of alumina crystal particles. However, the alumina-based sintered body contains other specific component in addition to the Si component, particularly contains the rare earth element (RE) component in a dispersed state so as to satisfy the condition described before. Therefore, the Si component preferentially forms high melting point glass phase together with the other component, rather than the low melting point glass phase. Therefore, in this invention, the Si component forms high melting point glass phase together with the other specific component, and is contained in the alumina-based sintered body in the content such that the low melting point glass phase is not substantially formed.

The content of the Si component in the alumina-based sintered body is adjusted to a range that does not exceed the total content of the sintering aids. For example, when the whole content of the alumina-based sintered body is defined as 100 mass %, the content of the Si component is preferably from 2.0 mass % to 4.0 mass %, and particularly preferably from 2.3 mass % to 3.5 mass %. In this invention, the content of the Si component is defined as mass % in terms of oxide when converted to "$SiO_2$" which is an oxide of the Si component.

The alumina-based sintered body contains a Group 2 element (2A) component derived from a sintering aid, such as an oxide of Group 2 element and an ion of Group 2 element. The Group 2 element (2A) component is a component containing elements belonging to Group 2 in the periodic table based on the recommendation of IUPAC 1990, and is, for example, at least two kinds selected from the group consisting of Mg component, Ca component and Ba component. In this invention, it is important that the Group 2 element (2A) component contains Mg and Ba as essential components and further contains at least one element excluding Mg and Ba, in Group 2 elements (2A) in the periodic table based on the recommendation of IUPAC 1990. The Group 2 element (2A) preferably includes Mg, Ca, Sr and Ba from the standpoint of low toxicity. The Group 2 element (2A) component in this invention preferably contains Mg component, Ba component and at least other one element excluding Mg component and Ba component, that is, a component of at least one element selected from the group consisting of Ca component and Sr component. More specifically, the Group 2 element (2A) component containing Mg component, Ba component and Ca component, the Group 2 element (2A) component containing Mg component, Ba component and Sr component, and the Group 2 element (2A) component containing Mg component, Ba component, Ca component and Sr component are preferred. The Group 2 element (2A) component in this invention is particularly preferably the Group 2 element (2A) component containing Mg component, Ba component and Ca component.

The Mg component functions as a sintering aid like the Si component before sintering. The Ba component, the Ca component and Sr component function as a sintering aid like the Mg component before sintering, and additionally have a function to improve mechanical strength in high temperature environment of the alumina-based sintered body obtained. When at least two kinds of those components are contained, preferably Mg component, Ba component, and at least other one element component excluding the Mg component and the Ba component, that is, Ca component and/or Sr component, are contained, and particularly preferably Mg component, Ba component and Ca component are contained, the above functions are synergistically exhibited, and withstand voltage characteristics can further be improved. Therefore, a combination in two components selected from the group consisting of Mg component, Ca component and Ba component is not particularly limited so long as withstand voltage characteristics when forming the insulator 3 are further improved. Thus, all of the combinations can be used. However, the above-exemplified Group 2 element (2A) components are particularly preferred in the point of excellent withstand voltage characteristics.

When the object is to improve mechanical strength in high temperature environment in addition to withstand voltage characteristics when forming the insulator 3, it is preferred that, of two components selected from the group consisting of Mg component, Ca component and Ba component, the Ba component is an essential component. Specifically, the Group 2 element (2A) component preferably contains at least one of Ba component, Mg component and Ca component, more preferably contains Mg component, Ba component and at least other one element component excluding the Mg component and the Ba component, and particularly preferably contains Ba component, Mg component and Ca component.

The content of the Group 2 element (2A) component in the alumina-based sintered body is adjusted to a range that does not exceed the total content of the sintering aids. For example, when the whole mass of the alumina-based sintered body is defined as 100 mass %, the content is preferably from 0.5 mass % to 2.5 mass %, and particularly preferably from 0.8 mass % to 2.2 mass %. The content of the Mg component, the content of the Ca component, the content of the Ba component and the content of the Sr component are appropriately adjusted to ranges that do not exceed the content of the Group 2 element (2A) component, respectively, and content ratio of each component is not particularly limited. For example, when the whole mass of the alumina-based sintered body is defined as 100 mass %, the content of the Mg component is selected from a range of preferably from 0 mass % to 0.5 mass %, and particularly preferably from 0.1 mass % to 0.5 mass %, the content of the Ca component is selected from a range of preferably from 0 mass % to 1.4 mass %, the content of the Ba component is selected from a range of preferably from 0 mass % to 1.0 mass %, and particularly preferably from 0.1 mass % to 1.0 mass %, and the content of other component such as Sr component is selected from a range of preferably from 0 mass % to 0.9 mass %, and particularly preferably from 0.2 mass % to 0.9 mass % (provided that the contents of two or more components are not simultaneously 0 mass %). In this invention, each content of the Group 2 element (2A) component is defined as mass % in terms of oxide when converted to its oxide "(2A)O". Specifically, the content of the Mg component is defined as mass % in terms of oxide when converted to MgO which is an oxide of the Mg component, the content of the Ca component is defined as mass % in terms of oxide when converted to CaO which is an oxide of the Ca component, the content of the Ba component is defined as mass % by terms of oxide when converted to BaO which is an oxide of the Ba component, and the content of the Sr component is defined as mass % in terms of oxide when converted to SrO which is an oxide of the Sr component. The content of the Group 2 element (2A) component is the total content of each content of the Group 2 element (2A) component, and specifically the total content of the content of the Mg component, the content of the Ba component, the content of the Ca component, the content of the Sr component, and the like.

The alumina-based sintered body contains Al component, a rare earth element (RE) component, Si component and the Group 2 element (2A) component, and substantially consists of the Al component, the rare earth element (RE) component, the Si component and the Group 2 element (2A) component. The term "substantially" used herein means that components other than the above components are not positively contained by addition and the like. However, each component of the alumina-based sintered body may contain slight amounts of unavoidable various impurities. It is preferred to remove those impurities as much as possible. However, the reality is, those impurities cannot completely be removed. Therefore, the alumina-based sintered body may contain unavoidable impurities in a range that the object of this invention is not impaired, in addition to each component described above. The unavoidable impurities that may be contained in the alumina-based sintered body include Na, S and N. Contents of those unavoidable impurities are better to be small. For example, when the total mass of Al component, Si component, a Group 2 element (2A) component and a rare earth element (RE) component is 100 parts by mass, the contents of the unavoidable impurities are 1.0 part by mass or less.

Thus, the alumina-based sintered body substantially consists of the above components, but may contain small amounts of other components such as B component, Ti component, Mn component and Ni component, in addition to the above Al component, rare earth element (RE) component, Si component and Group 2 element (2A) component.

The alumina-based sintered body containing Al component, rare earth element (RE) component, Si component and Group 2 element (2A) component has a theoretical density ratio of 95.0% or more. When the theoretical density ratio is 95% or more, the alumina-based sintered body is highly densified, the presence of pores capable of becoming fracture origin is extremely decreased, breakdown when forming the insulator 3 is difficult to occur, and withstand voltage characteristics are excellent. The alumina-based sintered body particularly preferably has a theoretical density ratio of 95.5% or more in the point of developing further excellent effect. The "theoretical density" is a density obtained by converting the content of each component contained in the alumina-based sintered body to an oxide and calculating from the content of each oxide converted by a mixing rule, and the "theoretical density ratio" shows the proportion of the alumina-based sintered body density measured by an Archimedes method to the theoretical density on percentage. Therefore, the upper limit of the theoretical density ratio in the alumina-based sintered body is 100%. A larger value of the theoretical density ratio indicates denser alumina-based sintered body.

The alumina-based sintered body containing Al component, rare earth element (RE) component, Si component and Group 2 element (2A) component is that the rare earth element (RE) component is dispersed so as to satisfy the above condition as described hereinafter. Contrary to this, the conventional alumina-based sintered body containing rare earth element (RE) component merely contains the component. An insulator formed by the conventional alumina-based sintered body could be satisfied with stand voltage characteristics and prevention of breakdown, required as an insulator of a spark plug used in the conventional internal combustion engines, in some cases.

The present inventors have found that to sufficiently satisfy withstand voltage characteristics and prevention of breakdown, required as an insulator of a spark plug used in internal combustion engines having higher power than ever, it is particularly important to contain Si component and at least two Group 2 element (2A) components selected from the group consisting of Mg component, Ca component and Ba component, particularly the Group 2 element (2A) component containing Mg and Ba as essential components and further containing at least other element excluding Mg and Ba in Group 2 elements of the periodic table based on the recommendation of IPUPAC 1990, in the alumina-based sintered body, and to disperse the rare earth element (RE) component in the alumina-based sintered body so as to satisfy the above condition. Thus, when the rare earth element (RE) component is dispersed in the alumina-based sintered body so as to satisfy the above condition, the rare earth element (RE) component is uniformly dispersed, and can further effectively prevent formation of low melting point glass phase to grain boundary and retention of pores in grain boundary in collaboration with the Si component and the Group 2 element (2A) component. As a result, the alumina-based sintered body having the rare earth element (RE) component dispersed therein so as to satisfy the condition can exhibit withstand voltage characteristics in higher level and can effectively prevent breakdown of the insulator 3, when forming the insulator 3. Therefore, even though the insulator 3 formed by the alumina-based sintered body is decreased in its thickness and is used in a spark plug used in internal combustion engines having high power, the insulator 3 does not almost generate breakdown and can exhibit higher withstand voltage characteristics at high temperature of 500 to 700° C.

Furthermore, when the rare earth element (RE) component is dispersed in the alumina-based sintered body so as to satisfy the above condition, the alumina-based sintered body has substantially uniform characteristics over the surface and the inside thereof, and when the insulator 3 is formed by grinding work or the like, the characteristics of the insulator 3 formed also are uniform. Therefore, according to this invention, the object of providing a spark plug including an insulator exhibiting higher withstand voltage characteristics can be achieved.

The above condition in the alumina-based sintered body is that "when 7 places of measurement lines (measurement length: 180 μm) are selected in the alumina-based sintered body and rare earth element (RE) present in each measurement line selected is analyzed with an energy dispersion method, the total number of the measurement lines in which 8 or more peaks derived from the rare earth element (RE) are observed is 4 places or more of 7 places". The reason why the rare earth element (RE) component is substantially uniformly dispersed in the alumina-based sintered body when the number of rare earth element-derived peaks is 8 or more in the measurement line having measurement length of 180 μm and the total number of the measurement lines in which 8 or more peaks derived from the rare earth element are observed is 4 places or more of 7 places, is based on many experimental facts. As is clear from Examples and Comparative Examples described hereinafter, it is confirmed that the withstand voltage characteristics of the alumina-based sintered body show higher value when the total number of the measurement lines in which the number of rare earth element-derived peaks is 8 or more in one measurement line and 8 or more peaks derived from the rare earth element (RE) are observed is 4 places of 7 places.

The condition is described in detail below. In this condition, first of all, the alumina-based sintered body is observed with an electron microscope. The alumina-based sintered body to be observed may be its outer surface or a cross section cut on a specific face. To improve analysis precision, the outer surface or the cross section is preferably mirror-polished to form a surface suitable for microscope observation (hereinafter also referred to as "observation surface"). The observation surface of the alumina-based sintered body is observed using, for example, a low vacuum analysis scanning electron microscope (as one example, JSM-6460LA (trade name), manufactured by JEOL Ltd.) with magnifying factor of about 700 times. The observation conditions are not particularly limited, and the observation is conducted at, for example, room temperature.

On the observation surface magnified and observed, 7 places of measurement lines having measurement length of 180 μm are selected as analytical target regions to be analyzed with an energy dispersion method. The measurement line selected may randomly be selected on the observation surface, and may be selected so as to have a specific rule, for example, equal distance in a longitudinal direction of the observation surface. When the dispersion state of the rare earth element (RE) component is analyzed further precisely, the measurement line is preferably selected according to a specific rule.

To the respective measurement lines of 7 places thus selected, the rare earth element (RE) present along the measurement length direction is analyzed with an energy dispersion method. This analysis may be carried out with an energy dispersion spectrometer provided in the low vacuum analysis scanning electron microscope, and may be carried out with an energy dispersion X-ray analyzer (for example, EX-23000BU (trade name), manufactured by JEOL Ltd.). The analysis is carried out in SEI (secondary electron image) mode and using Ka ray as X ray under the conditions of accelerating voltage of 20 kV and cumulated number of 100 times.

When each measurement line is thus analyzed, 7 kinds of measurement charts in each measurement line are obtained. Peaks derived from the rare earth element (RE) (hereinafter also referred to as "rare earth element-derived peaks") and peaks other than the rare earth element-derived peaks appear on those measurement charts as shown in, for example, FIG. 2 and FIG. 3.

Figure 2:
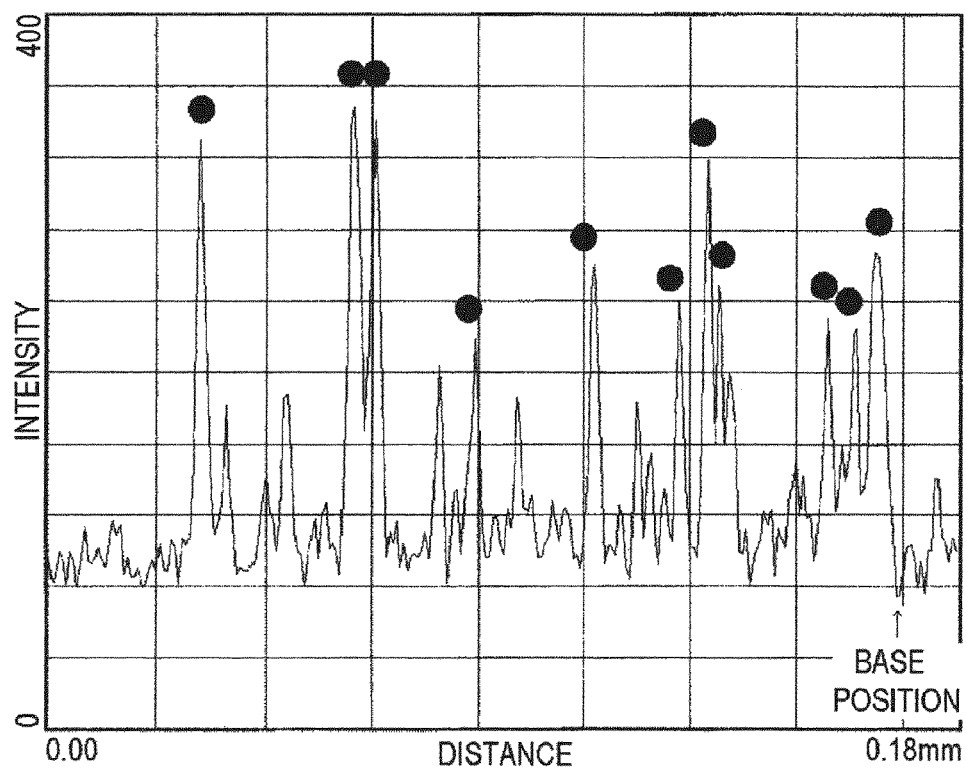
FIG. 2 is a view showing a measurement chart obtained by analyzing a certain measurement line in the alumina-based sintered body of Example 1 with an energy dispersion method.
Figure 3:
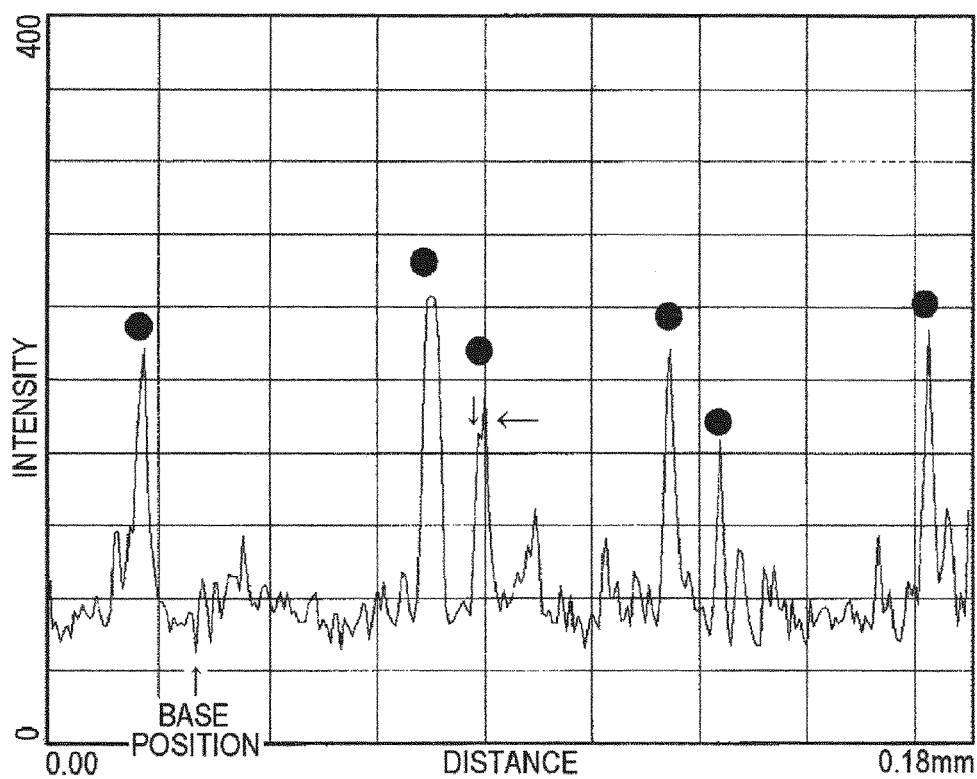
FIG. 3 is a view showing a measurement chart obtained by analyzing other measurement line in the alumina-based sintered body of Example 1 with an energy dispersion method.

In the above conditions, the number of the rare earth element-derived peaks appeared is counted in every measurement chart obtained. Identification and number count of the rare earth element-derived peaks in each measurement chart are conducted based on the following standard. In FIG. 2 and FIG. 3, black circle is attached to (the upper part of) the rare earth element-derived peaks identified based on the following standard.

(1) In one measurement chart, peak intensity is a peak length of from a "base position" (shown by an arrow in FIG. 2 and FIG. 3) which is a position of the weakest intensity shown in the measurement to the top of each peak.

(2) In one measurement chart, the rare earth element-derived peak is all of peaks having peak intensity one-half or more the strongest peak having the strongest peak intensity in the measurement chart.

(3) In one measurement chart, in the case that adjacent two rare earth element-derived peaks do not have peak intensity valley portion having decreased peak intensity corresponding to 10% or more peak intensity of the strongest peak to a weak peak intensity in the adjacent two rare earth element-derived peaks, between the adjacent two rare earth element-derived peaks, the adjacent two rare earth element-derived peaks are counted as one peak. For example, it is confirmed in FIG. 3 that the rare earth element-derived peak in the vicinity of distance of about 0.086 (an arrow is shown in X axis direction) has a small peak in the vicinity of distance of about 0.085 (an arrow is shown in Y axis direction). Because only peak intensity valley portion having slightly decreased intensity is present between those two peaks, those two peaks are combined and considered as one rare earth element-derived peak.

The number of the rare earth element-derived peaks in 7 kinds of measurement charts is counted according to the standard. In each measurement chart, the number of measurement charts in which the number of the rare earth element-derived peaks measured according to the standard (that is, the number of measurement lines) is 8 or more is counted, and the total number of those measurement charts (that is, the total number of measurement lines) is obtained. Judgment is made by the total number of measurement charts (the total number of measurement lines) to the whole measurement chart number (whole measurement line number) obtained form all of measurement lines. That is, it is judged that the condition is satisfied when the total number of measurement charts (the total number of measurement lines) is 4 or more in the number of measurement chart (the whole measurement line number) of 7, and on the other hand, the condition is not satisfied when the total number of measurement charts (the total number of measurement lines) is 3 or less in the number of measurement chart (the whole measurement line number) of 7.

In the rare earth element-derived peak identified based on the above standard, the adjacent two rare earth element-derived peaks have their interval (distance) of preferably 80 μm or less, and particularly preferably 60 μm or less. When the adjacent two rare earth element-derived peaks are present with an interval fallen within the above range, the rare earth element (RE) components within the measurement line are present further uniformly. That is, the rare earth element (RE) components in the alumina-based sintered body are dispersed further uniformly. As a result, the insulator 3 formed by the alumina-based sintered body is highly difficult to case breakdown and can exhibit extremely high withstand voltage characteristics.

As described above, the alumina-based sintered body is an alumina-based sintered body having a theoretical density ratio of 95.0% or more which contains the rare earth element (RE) component, the Si component, the Group 2 element (2A) component containing at least two Group 2 element components selected from the group consisting of Mg component, Ca component and Ba component, preferably the Group 2 element (2A) component containing Mg and Ba as essential components and further containing at least one other element excluding Mg and Ba in the Group 2 elements in the periodic table based on the recommendation of IUPAC 1990, the rare earth element (RE) component being dispersed so as to satisfy the above condition. Therefore, the rare earth element (RE) component is uniformly dispersed in the alumina-based sintered body, and can effectively prevent formation of low melting point glass phase to grain boundary and retention of pores in grain boundary in collaboration with the Si component and the Group 2 element (2A) component. Even though the insulator 3 formed by the alumina-based sintered body is decreased in its thickness and is used for internal combustion engines having high power, the insulator 3 is difficult to cause breakdown, and can exhibit higher withstand voltage characteristics at high temperature of 500 to 700° C. The alumina-based sintered body exhibiting such excellent characteristics is particularly useful as a spark plug including the insulator 3 having small size and decreased thickness, and a material of the insulator 3 used in a spark plug for internal combustion engines having high power.

Therefore, the insulator 3 formed by the alumina-based sintered body is difficult to cause breakdown and can exhibit higher withstand voltage characteristics even at high temperature of 500 to 700° C. Thus, according to this invention, the object to provide the spark plug 1 including the insulator 3 which is difficult to cause breakdown and exhibits higher withstand voltage characteristics can be achieved.

The alumina-based sintered body is obtained by sintering raw material powders satisfying the above composition. For example, the alumina-based sintered body can be produced by a step of mixing Al compound powder, generally alumina powder, rare earth element (RE) compound powder, Si compound powder, and at least two Group 2 element (2A) compound powders selected from the group consisting of Mg compound powder, Ca compound powder and Ba compound powder, preferably Mg compound powder, Ba compound powder and Group 2 element (2A) compound powder other than those powders, thereby preparing a raw material powder; a step of molding the raw material powder into a molded article having a given shape; and a step of burning the molded article by holding the molded article at a temperature in a range of 1,530 to 1,700° C. for 1 to 8 hours.

More specifically, an Al compound powder, generally an alumina ($Al_2O_3$) powder, a rare earth element (RE) compound powder, an Si compound powder, and at least two Group 2 element (2A) compound powders selected from the group consisting of an Mg compound powder, a Ca compound powder and a Ba compound powder, preferably a Mg compound powder, a Ba compound powder and a Group 2 element (2A) compound powder other than those powders, are mixed in the proportions that each content thereof (whole mass of raw material powders is 100 mass %) is the same content as each content of each component converted from those compound powders in the alumina-based sintered body obtained, and a hydrophilic binder and a solvent are added to am mixed with the resulting mixture. Thus, slurry is prepared.

The Al compound powder is not particularly limited so long as a compound converts into Al component by burning, and alumina ($Al_2O_3$) powder is generally used. The Al compound powder realistically contains unavoidable impurities such as Na. Therefore, high purity powder is preferably used. For example, purity of the Al compound powder is preferably 99.5% or more. The Al compound powder generally uses a powder having an average particle diameter of from 0.1 μm to 5.0 μm to obtain a dense alumina-based sintered body. The average particle diameter is a value measured by a laser diffraction method (LA-750, manufactured by HORIBA).

The rare earth element (RE) compound powder is not particularly limited so long as a compound converts into a rare earth element (RE) component by burning. Examples of the powder include powders of an oxide of rare earth element (RE) and its composite oxide. In the case of using a powder other than an oxide as the rare earth element (RE) compound powder, the amount of the powder used is recognized by mass % in terms of oxide when converted to oxide. Purity and average particle diameter of the rare earth element (RE) compound powder are basically the same as the Al compound powder.

The Si compound powder is not particularly limited so long as a compound converts into Si component by burning. Examples of the powder include various inorganic powders such as oxide (including composite oxide), hydroxide, carbonate, chloride, sulfate, nitrate and phosphate of Si. Specific example of the powder includes $SiO_2$ powder. In the case of using a powder other than an oxide as the Si compound powder, the amount of the powder used is recognized by mass % in terms of oxide when converted to oxide. Purity and average particle diameter of the Si compound powder are basically the same as the Al compound powder.

The Group 2 element (2A) compound powders are not particularly limited so long as powders are powders of compounds converting into the Group 2 element (2A) components by burning, that is, at least two Group 2 element components selected from the group consisting of Mg component, Ca component and Ba component, preferably a Group 2 element (2A) component containing Mg component, Ba component and at least other one element excluding those, more preferably Mg component, Ba component, and at least one element component selected from the group consisting of Ca component and Sr component, and particularly preferably Mg component, Ba component and Ca component. Examples of the Group 2 element (2A) compound powder include oxide (including composite oxide), hydroxide, carbonate, chloride, sulfate, nitrate and phosphate of Group 2 element (2A). Specifically, the Mg compound powder includes MgO powder and $MgCO_3$ powder, the Ca compound powder includes CaO powder and $CaCO_3$ powder, the Ba compound powder includes BaO powder and $BaCO_3$ powder, and the Sr compound powder includes SrO powder and $SrCO_3$ powder. In the case of using a powder other than an oxide as the Group 2 element (2A) compound powder, the amount of the powder used is recognized by mass % in terms of oxide when converted to oxide so as to satisfy the content in the alumina-based sintered body obtained. Purity and average particle diameter of the Group 2 element (2A) compound powder are basically the same as the Al compound powder.

The Group 2 element (2A) compound powder contains Ba compound powder as an essential component in two kinds selected from the group consisting of Mg compound powder, Ca compound powder and Ba compound powder. Specifically, the Group 2 element (2A) compound powder contains Ba compound powder and at least one of Mg compound powder and Ca compound powder, as essential components. In this invention, the Group 2 element (2A) compound powder preferably contains Mg compound powder, Ba compound powder and at least other one element compound powder excluding the Mg compound powder and the Ba compound powder, that is, at lest one element compound powder selected from the group consisting of Ca compound powder and Sr compound powder. The Group 2 element (2A) compound powder containing Mg compound powder, Ba compound powder and Ca compound powder is particularly preferred.

Those raw material powders are generally mixed for 8 hours or more. Where the mixing time of the raw material powders is less than 8 hours, mixing state of the raw material powders is not highly uniform. Even though raw material powders containing Al compound powder, rare earth element (RE) compound powder, Si compound powder, and a Group 2 element (2A) component powder containing Mg compound powder and Ba compound powder as essential components and further containing at least other one element excluding those are sintered, the rare earth element (RE) component is difficult to be dispersed so as to satisfy the above condition.

Examples of the hydrophilic binder include polyvinyl alcohol, water-soluble acryl resin, gum arabic and dextrin. Examples of the solvent include water and alcohol. Those hydrophilic binders and solvents can be used alone or as mixtures of two or more thereof. The proportion of the hydrophilic binder and water used is that when the raw material powder is 100 parts by mass, the hydrophilic binder is 0.1 to 5 parts by mass (preferably 0.5 to 3 parts by mass). When water is used as the solvent, the amount of water used is 40 to 120 parts by mass (preferably 50 to 100 parts by mass).

The slurry thus obtained has pH of preferably 7.5 to 9.5, and particularly preferably 8 to 9.5. When the pH of the slurry is fallen within the above range, the rare earth element (RE) compound powder is uniformly dispersed in the slurry, and as a result, an alumina-based sintered body having the rare earth element (RE) compound powder dispersed therein so as to satisfy the above condition can be prepared. The pH of the slurry is a value when the slurry is adjusted to have a water content of 35%, and can be measured using, for example, the conventional pH meter.

The slurry can be adjusted to have an average particle diameter, for example, of 1.4 µm to 5 µm. The slurry thus obtained is spray dried with a spray dry method or the like to granulate to particles having an average particle diameter of from 50 µm to 200 µm (preferably from 70 µm to 150 µm). The average particle diameter is a value measured with a laser diffraction method (LA-750, manufactured by HORIBA). The particles are molded to obtain a molded article. The molded article is ground according to need, processed into a desired shape by polishing or the like, and then burned in the atmosphere at 1,530 to 1,700° C. (more preferably 1,550 to 1,650° C.) for 1 to 8 hours (more preferably 1 to 2 hours). Thus, an alumina-based sintered body is obtained. When the raw material powder having the above composition is burned as above, an alumina-based sintered body satisfying the above condition and having a theoretical density ratio of 95.0% or more can be obtained.

Where the burning temperature is lower than 1,530° C. or the burning time is shorter than 1 hour, the alumina-based sintered body obtained cannot sufficiently be densified, and the alumina-based sintered body cannot have a theoretical density ratio of 95.0% or more. Where the burning temperature exceeds 1,700° C. or the burning time exceeds 8 hours, alumina particles abnormally grow in the alumina-based sintered body, and withstand voltage characteristics and mechanical strength of the alumina-based sintered body obtained tend to be decreased. The theoretical density ratio of the alumina-based sintered body obtained can be adjusted by an average particle diameter, a burning temperature and the like of the raw material powder in addition to the composition, the sintering conditions and the like. For example, where an average particle diameter of the raw material powder is increased, the theoretical density ratio tends to be increased. Where the sintering temperature is decreased, the theoretical density ratio tends to be increased.

The alumina-based sintered body thus burned contains the above-described specific components, has the rare earth element (RE) component dispersed therein so as to satisfy the above condition, and has a theoretical density ratio of 95.0% or more. Therefore, the alumina-based sintered body is highly difficult to cause breakdown and can exhibit high withstand voltage characteristics even at high temperature of 500 to 700° C. Furthermore, the alumina-based sintered body obtained is satisfied with at least one of the condition (1) and the condition (2), or has RE-β-alumina crystal phase having the composition shown by the compositional formula. Particularly, in the case that the rare earth element (RE) component is at least one component selected from the group consisting of the La component, Pr component, Nd component and Sm component, the alumina-based sintered body has the RE-β-alumina crystal phase. Therefore, the alumina-based sintered body can exhibit higher withstand voltage characteristic and higher mechanical strength in high temperature environment. Therefore, the alumina-based sintered body obtained is particularly suitable for a spark plug including the insulator 3 having a small size and decreased thickness, and a material of the insulator 3 used in a spark plug for internal combustion engines having high power. If desired, the alumina-based sintered body may again change its shape. Thus, the alumina-based sintered body and the insulator 3 for a spark plug 1, constituted of the alumina-based sintered body can be prepared.

The spark plug 1 is produced, for example, as follows. An electrode material such as Ni-based alloy is processed into a given shape to prepare a center electrode 2 and/or a grounding electrode 6. Preparation and processing of the electrode material can continuously be conducted. For example, a melt of Ni-based alloy having a desired composition is prepared using a vacuum melting furnace, an ingot is prepared from each melt by vacuum casting, and the ingot is subjected to hot processing, drawing process and the like to appropriately adjust to have a given shape and a given size. Thus, the center electrode 2 and/or the grounding electrode 6 can be prepared. An inner member 8 can be inserted in an outer member 7 molded into a cap shape, and the center electrode 2 can be formed by plastic processing such as extrusion processing.

One end portion of the grounding electrode 6 is joined to an end surface of a metal shell 4 formed into a given shape by plastic processing, with electric resistance welding or the like, if desired, followed by washing with about 10% hydrochloric acid, water and the like. The raw material powder is burned as described above to prepare an insulator 3 having given shape and size. The center electrode 2 is assembled to the insulator 3 by the conventional method, and the insulator 3 is assembled to the metal shell 4 having the grounding electrode 6 joined thereto. The front end surface of the grounding electrode 6 is bent to the center electrode 2 side, so that one end of the grounding electrode 6 faces the front end portion of the grounding electrode 2. Thus, the spark plug 1 is produced.

The spark plug according to the present invention is used as an igniter plug of automotive internal combustion engines such as gasoline engine. The screw portion 9 is threadably mounted on a screw hole provided in a head (not shown) partitioning and forming a combustion chamber of internal combustion engines, and is fixed to a given position. The spark plug according to this invention can be used in any internal combustion engines. The alumina-based sintered body forming the insulator 3 is difficult to cause breakdown and has excellent withstand voltage characteristics. Therefore, the spark plug 1 according to this invention can preferably be used in internal combustion engines having high power.

The spark plug according to this invention is not limited to the above-described examples, and various modifications can be made in a scope that the object of the present invention can be achieved. For example, the spark plug 1 is arranged such that the front end surface of the center electrode 2 faces the surface of one end of the grounding electrode 6 in an axis line AX direction of the center electrode through the spark discharge gap G. However, in this invention, the spark plug may be arranged such that the side surface of the center electrode faces the front end surface of one end of the grounding electrode in a radius direction of the center electrode through the spark discharge gap. In this case, single or plural grounding electrodes facing the side surface of the center electrode may be provided.

The spark plug 1 includes the center electrode 2 and the grounding electrode 6. In this invention, a noble metal tip may be provided on the front end portion of the center electrode and/or the surface of the grounding electrode. The noble metal tip formed on the front end portion of the center electrode and the surface of the grounding electrode generally has a columnar shape, is adjusted to an appropriate size, and melt fixed to the front end portion of the center electrode and the surface of the grounding electrode by appropriate welding methods such as laser welding or electric resistance welding. The spark discharge gap is formed between the surface of the noble metal tip formed on the front end portion of the center electrode and the surface of the noble metal tip formed on the surface of the grounding electrode. The material forming the noble metal tip includes noble metals such as Pt, Pt alloy, Ir and Jr alloy.

EXAMPLES

Alumina powder (containing a slight amount of Na as unavoidable impurities) having an average particle diameter of 2.1 µm and a purity of 99.5% or more, $SiO_2$ powder having an average particle diameter of 2.8 µm and a purity of 99.5% or more, $MgCO_3$ powder having an average particle diameter of 6.0 µm and a purity of 99.5% or more, $CaCO_3$ powder having an average particle diameter of 2.0 µm and a purity of 99.5% or more, $BaCO_3$ powder having an average particle diameter of 5.0 µm and a purity of 99.5% or more, $La_2O_3$ powder having an average particle diameter of 9.0 µm and a purity of 99.5% or more, $Nd_2O_3$ powder having an average particle diameter of 4.0 µm and a purity of 99.5% or more, $Sm_2O_3$ powder having an average particle diameter of 3.0 µm and a purity of 99.5% or more, $Er_2O_3$ powder having a purity of 99.5% or more, $Yb_2O_3$ powder having an average particle diameter of 1.3 µm and a purity of 99.5% or more, and $Y_2O_3$ powder having an average particle diameter of 1.0 µm and a purity of 99.5% or more were weighed and mixed in proportions ($MgCO_3$, $CaCO_3$ and $BaCO_3$ as carbonate compounds are converted to the mass in terms of the respective oxides) becoming mass in terms of oxide (mass %) shown in Table 1. Thus, raw material powders having the raw material powder compositions shown in Table 1 were prepared.

Each of those raw material powders was introduced into a resin-made pot (volume: 2.4 liters), and mixed and pulverized using alumina pebbles having a diameter of 10 mm in the mixing time shown in Table 2. A hydrophilic binder (2 parts by mass per 100 parts by mass of the raw material powder mixed and pulverized) was added to and mixed with the resulting mixture to prepare slurry. The slurry obtained was adjusted to have water content of 35%, and its pH was measured using a pH meter (trade name: Navi, manufactured by HORIBA). The measurement results are shown in Table 2. Each slurry was spray dried with a spray drying method, and granulated into a powder having an average particle diameter of about 100 µm by a laser diffraction method.

The powder granulated was molded into a molded article having a diameter of 23 mm with an isostatic press of 100 MPa. The molded article was burned in the atmosphere at a burning temperature shown in Table 2 for the burning time shown in Table 2. Thus, an alumina-based sintered body was produced. The mixing ratio (raw material powder composition) in the raw material powders in Table 1 substantially corresponded with the content (mass % in terms of oxide) of each component calculated by fluorescent X-ray analysis or chemical analysis of the alumina-based sintered body.

TABLE 1

| Raw Material Powder Composition | Content in Alumina-Based Sintered Body | | | Content in Sintering Aid | | | | | | | | | |
|---|---|---|---|---|---|---|---|---|---|---|---|---|---|
| | Al Component | Total Sintering Aid | Rare Earth Element (RE) Component | Si Component | Group 2 Element Component | | | Rare Earth Element (RE) Component | | | | | |
| | $Al_2O_3$ | | | $SiO_2$ | MgO | BaO | CaO | $La_2O_3$ | $Nd_2O_3$ | $Sm_2O_3$ | $Er_2O_3$ | $Yb_2O_3$ | $Y_2O_3$ |
| 1 | 95.03 | 4.97 | 1.44 | 31.99 | 5.43 | 13.48 | 20.12 | 28.97 | — | — | — | — | — |
| 2 | 94.92 | 5.08 | 1.44 | 51.97 | 5.31 | 3.64 | 10.63 | 28.45 | — | — | — | — | — |
| 3 | 94.70 | 5.30 | 1.44 | 49.05 | 3.97 | 13.11 | 6.80 | 27.07 | — | — | — | — | — |
| 4 | 94.66 | 5.34 | 1.44 | 47.75 | 3.93 | 14.23 | 7.12 | 26.97 | — | — | — | — | — |
| 5 | 94.74 | 5.26 | 1.44 | 50.76 | 3.42 | 12.36 | 6.08 | 27.38 | — | — | — | — | — |
| 6 | 94.89 | 5.11 | 1.44 | 50.29 | 5.87 | 3.91 | 11.74 | 28.18 | — | — | — | — | — |
| 7 | 96.47 | 3.53 | — | 45.04 | 7.65 | 18.98 | 28.33 | — | — | — | — | — | — |
| 8 | 95.94 | 4.06 | 0.20 | 64.29 | 4.93 | 17.24 | 8.62 | 4.93 | — | — | — | — | — |
| 9 | 92.14 | 7.86 | 4.00 | 33.21 | 2.54 | 8.91 | 4.45 | 50.89 | — | — | — | — | — |
| 10 | 90.03 | 9.97 | 6.44 | 15.95 | 2.71 | 6.72 | 10.03 | 64.59 | — | — | — | — | — |
| 11 | 94.70 | 5.30 | 1.44 | 49.25 | 3.77 | 13.21 | 6.60 | — | 27.17 | — | — | — | — |
| 12 | 94.70 | 5.30 | 1.44 | 49.25 | 3.77 | 13.21 | 6.60 | — | — | 27.17 | — | — | — |
| 13 | 94.70 | 5.30 | 1.44 | 49.25 | 3.77 | 13.21 | 6.60 | — | — | — | 27.17 | — | — |
| 14 | 95.03 | 4.97 | 1.44 | 31.99 | 5.43 | 13.48 | 20.12 | — | — | — | — | 28.97 | — |
| 15 | 95.03 | 4.97 | 1.44 | 31.99 | 5.43 | 13.48 | 20.12 | — | — | — | — | — | 28.97 |
| 16 | 98.56 | 1.44 | 1.44 | — | — | — | — | 100 | — | — | — | — | — |
| 17 | 93.51 | 6.49 | 1.44 | 57.78 | — | — | 20.03 | — | 22.19 | — | — | — | — |

In each alumina-based sintered body thus obtained, density of each alumina-based sintered body measured with Archimedes method was measured according to the measurement method of "apparent density" defined in JIS R1634 (1998), and a ratio (theoretical density ratio) to the density calculated by the mixing rule was calculated. The results are shown in Table 2.

Figure 4:
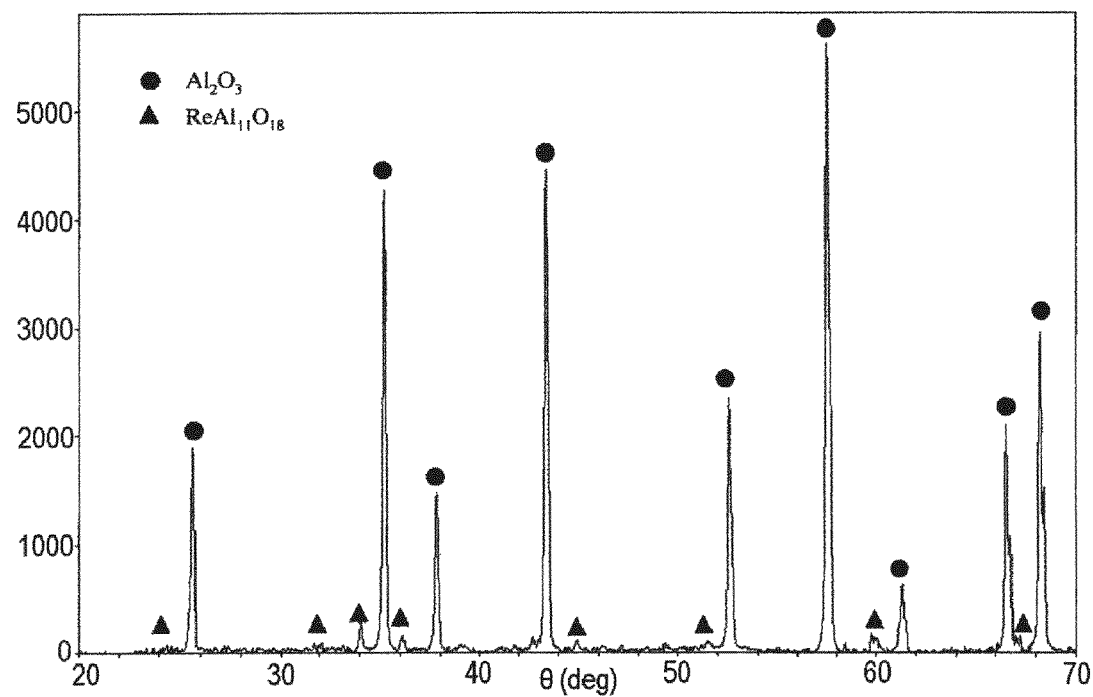
FIG. 4 is an X-ray diffraction chart of the alumina-based sintered body (Example 6) having crystals of La-β-alumina structure ($LaAl_{11}O_{18}$).

The surface of each alumina-based sintered body was subjected to X-ray diffraction, and the presence or absence of a crystal phase having La-β-alumina structure was judged by whether or not spectrum corresponding to JCPDS card No. 33-699 of La-β-alumina is present. Furthermore, comparing with the JCPDS card, the presence or absence of a crystal phase of Pr-β-alumina, the presence or absence of a crystal phase of Nd-β-alumina, the presence or absence of a crystal phase of Sm-β-alumina, the presence or absence of a crystal phase of Er-β-alumina, the presence or absence of a crystal phase of Vb-β-alumina, and the presence or absence of a crystal phase of Y-β-alumina were judged. The results are shown in Table 2. X-ray diffraction chart of the alumina-based sintered body (Example 6) having a crystal of La-β-alumina structure ($LaAL_{11}O_{18}$) is shown in FIG. 4.

Whether or not each alumina-based sintered body is satisfied with the above condition was confirmed based on the above method using low vacuum analysis scanning electron microscope (JSM-6460LA (trade name), manufactured by JEOL Ltd.). That is, 7 places of measurement lines on the outer surface of each alumina-based sintered body were randomly selected, and each measurement line selected was analyzed by an energy dispersion method in SEI mode using Ka ray as X-ray under the conditions of accelerating voltage of 20 kV and cumulated number of 100 times. Thus, seven measurement charts were obtained. The number of rare earth element-derived peaks appeared on each measurement chart was counted according to the above-described standard, and the proportion (shown as "concordance proportion" in Table 2) of the measurement charts having the number of the rare earth element-derived peaks of 8 or more to the whole 7 measurement charts of the total number of the measurement charts was obtained. Furthermore, in each alumina-based sintered body, the maximum gas (μm) in gaps of adjacent two rare earth element-derived peaks in 7 measurement charts was obtained. Those results are shown in Table 2.

FIG. 2 shows the measurement chart on which 11 rare earth element-derived peaks appeared, obtained by analyzing a certain measurement line in the alumina-based sintered body of Example 1 with an energy dispersion method, and FIG. 3 shows the measurement chart on which 6 rare earth element-derived peaks appeared, obtained by analyzing a different measurement line in the alumina-based sintered body of Example 1 with an energy dispersion method.

The surface of each of the alumina-based sintered bodies obtained in Examples 5 to 7 and 12 and Comparative Examples 1 and 2 was mirror-polished, and the polished surface was subjected to a thermal etching treatment at a temperature 100° C. lower than each burning temperature shown in Table 2 for 10 minutes. The treated surface was observed with a scanning electron microscope (SEM), and an average crystal particle diameter $D_A(Al)$ of alumina crystal was measured with an intercept method as described before. Furthermore, the surface of each of the alumina-based sintered bodies of Examples 5 to 7 and 12 and Comparative Examples 1 and 2 was observed with a scanning electron microscope (SEM). A diameter of a circle corresponding to a "light color region" extracted was calculated as described before, and the diameter was used as a crystal particle diameter $D_E(RE)$ of RE-β-alumina crystal phase. Furthermore, an arithmetic average value of the crystal particle diameter $D_E(RE)$ was used as an average crystal particle diameter $D_A(RE)$ of RE-β-alumina crystal phase. $D_A(RE)/D_A(Al)$ was obtained from an average crystal diameter $D_A(Al)$ of alumina crystal thus calculated, and the crystal particle diameter $D_E(RE)$ and the average crystal particle diameter $D_A(RE)$ of RE-β-alumina crystal phase. The number of the RE-β-alumina crystal phases becoming $D_E(RE)/D_A(Al) \geqq 2$ was counted. Those results are shown in Table 3.

The RE-β-alumina crystal phase present on each of the alumina-based sintered bodies obtained in Examples 5 to 7 and 12 and Comparative Examples 1 and 2 was subjected to elemental analysis under the above-described measurement conditions using an energy dispersion X-ray analyzer (EDX) attached to a transmission electron microscope (TEM), and the composition of RE-β-alumina crystal phase: $RE(2A)_x(Al)_yO_z$ was confirmed. The results are shown in Table 3.

(Withstand Voltage Characteristics)

Figure 5:
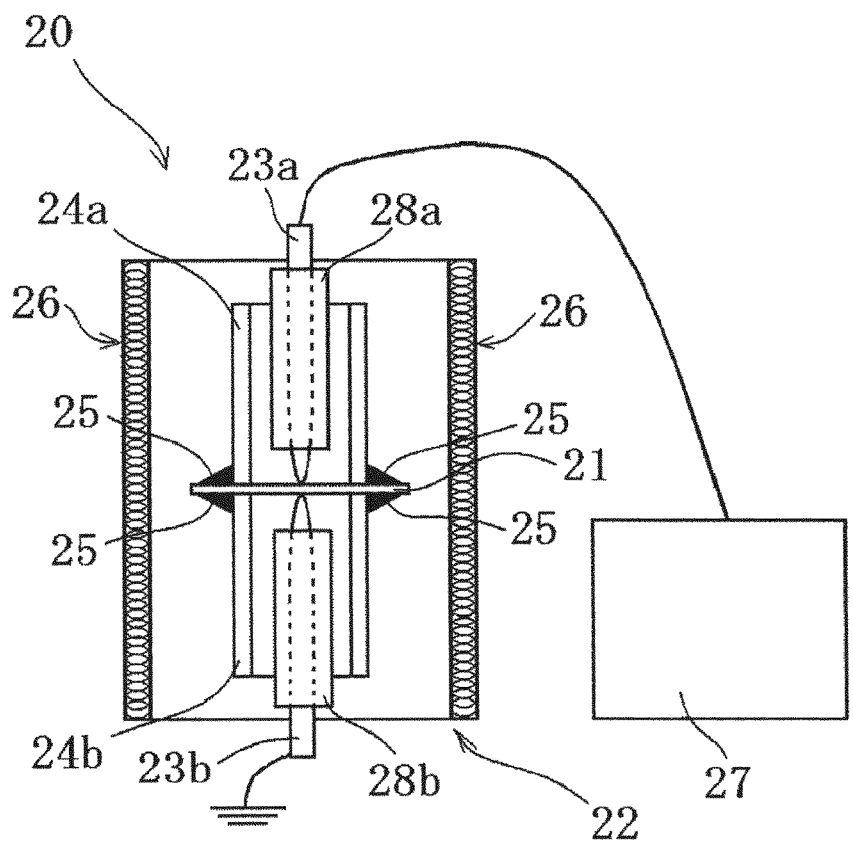
FIG. 5 is a schematic sectional view showing an outline of a withstand voltage measuring device.

A disc-shaped test piece having a diameter of 18 mm and a thickness of 0.6 mm was prepared in the same manner as in the production of the alumina-based sintered body, and withstand voltage value at 700° C. was measured using a withstand voltage measuring device 20 shown in FIG. 5. As shown in FIG. 5, the withstand voltage measuring device 20 is that in a heating box 22, a disc-shaped test piece 21 is sandwiched between an electrode 23a connected to a high voltage generating device (CDI power source) and an electrode 23b grounded from an axis line direction of the disc-shaped test piece 21 in the axis line direction. Furthermore, the disc-shaped test piece 21 is sandwiched between alumina-made insulator cylinders 24a and 24b so as to surround the electrode 23a and the electrode 23b from an axis line direction of the disc-shaped test piece 21 in the axis line direction. The contact portions between the front and rear surfaces of the disc-shaped test piece and the alumina-made insulator cylinders 24a and 24b are fixed with a $SiO_2$ type sealing glass 25 over the entire periphery of the insulator cylinders 24a and 24b. In the electrode 23a and electrode 23b, the front end portion contacting the disc-shaped test piece 21 has a taper shape in which a diameter is gradually narrowed toward the front end portion. The measurement was conducted after confirming that contact area to the disc-shaped test piece 21 is 0.30 $mm^2$ or less. The electrodes 23a and 23b have the periphery covered with the alumina-made insulator cylinders 28a and 28b to prevent generation of discharge between the respective electrode and the heating box 22. Using the withstand voltage measuring device 20, a constant high voltage was applied to the disc-shaped test piece 21 with a high voltage generating device 27 that can apply high voltage of several ten kV to the disc-shaped test piece 21 in the heating box 22 adjusted to 700° C. by a electric heater, and voltage value when breakdown was generated in the disc-shaped test piece 21 was measured as "withstand voltage value" of the disc-shaped test piece 21. The results are shown in Table 2.

(Strength)

Test pieces of 48 mm×4 mm×3 mm were prepared in the same manners as the productions of the alumina-based sintered bodies in Examples 5 to 7 and 12 and Comparative Examples 1 and 2, respectively. Three-point bend strength (span 30 mm) at 700° C. was measured according to the measurement method defined in HS R1604. The three-point bend strength at 700° C. is called "strength at high temperature". The results are shown in Table 3.

TABLE 2

| | Raw Material Powder Composition | Mixing Time (h) | Ph of Slurry | Sintering Temperature (° C.) | Sintering Time (h) | Theoretical Density Ratio (%) | RE-β-Alumina Crystal Phase | Withstand Voltage (kV/mm) |
|---|---|---|---|---|---|---|---|---|
| Ex. 1 | 2 | 12 | 8.2 | 1540 | 2 | 96.2 | Presence | 80 |
| Ex. 2 | 3 | 12 | 8.7 | 1560 | 2 | 96.5 | Presence | 85 |
| Ex. 3 | 2 | 15 | 8.2 | 1560 | 2 | 96.8 | Presence | 82 |
| Ex. 4 | 4 | 10 | 9.5 | 1540 | 2 | 96.0 | Presence | 86 |
| Ex. 5 | 5 | 10 | 8.3 | 1580 | 2 | 96.5 | Presence | 86 |

TABLE 2-continued

| | | | | | | | | |
|---|---|---|---|---|---|---|---|---|
| Ex. 6 | 1 | 12 | 8.9 | 1600 | 1 | 96.5 | Presence | 80 |
| Ex. 7 | 1 | 15 | 8.9 | 1620 | 1 | 96.8 | Presence | 80 |
| Ex. 8 | 6 | 10 | 8 | 1540 | 4 | 96.3 | Presence | 80 |
| Ex. 9 | 3 | 12 | 8.7 | 1560 | 2 | 96.4 | Presence | 86 |
| Ex. 10 | 3 | 12 | 8.7 | 1560 | 2 | 96.5 | Presence | 85 |
| Ex. 11 | 8 | 10 | 9.3 | 1600 | 2 | 96.5 | Presence | 81 |
| Ex. 12 | 9 | 10 | 9.5 | 1560 | 2 | 95.0 | Presence | 80 |
| Ex. 13 | 11 | 10 | 9.2 | 1600 | 2 | 96.4 | Presence | 85 |
| Ex. 14 | 12 | 12 | 8.9 | 1600 | 2 | 96.4 | Presence | 86 |
| Ex. 15 | 13 | 12 | 7.9 | 1600 | 2 | 96.6 | Absence | 76 |
| Ex. 16 | 14 | 12 | 7.8 | 1580 | 2 | 96.2 | Absence | 76 |
| Ex. 17 | 15 | 12 | 7.6 | 1580 | 2 | 96.2 | Absence | 76 |
| Ex. 18 | 10 | 10 | 7.9 | 1540 | 8 | 95.2 | Presence | 71 |
| C. Ex. 1 | 1 | 3 | 7.4 | 1540 | 2 | 96.0 | Presence | 65 |
| C. Ex. 2 | 5 | 5 | 7.3 | 1560 | 2 | 96.5 | Presence | 62 |
| C. Ex. 3 | 1 | 12 | 8.4 | 1500 | 2 | 94.0 | Presence | 60 |
| C. Ex. 4 | 7 | 10 | 7.9 | 1560 | 2 | 96.1 | Presence | 66 |
| C. Ex. 5 | 16 | 15 | 8.2 | 1540 | 2 | 92.8 | Presence | 45 |
| C. Ex. 6 | 17 | 15 | 8.3 | 1500 | 2 | 93.0 | Presence | 46 |

| | Rare Earth Element (RE) Component Condition | | | | | | | |
|---|---|---|---|---|---|---|---|---|
| | Mutching Ratio | Maximum Interval (μm) | Number of Peaks | | | | | |
| | | | Line 1 | Line 2 | Line 3 | Line 4 | Line 5 | Line 6 | Line 7 |
| Ex. 1 | 5/7 | 50 | 11 | 9 | 12 | 6 | 11 | 8 | 7 |
| Ex. 2 | 7/7 | 40 | 11 | 11 | 9 | 15 | 15 | 13 | 9 |
| Ex. 3 | 6/7 | 45 | 7 | 15 | 13 | 8 | 11 | 9 | 9 |
| Ex. 4 | 5/7 | 40 | 10 | 11 | 9 | 9 | 7 | 14 | 10 |
| Ex. 5 | 6/7 | 55 | 12 | 12 | 7 | 9 | 6 | 10 | 11 |
| Ex. 6 | 7/7 | 45 | 10 | 18 | 16 | 12 | 9 | 9 | 10 |
| Ex. 7 | 6/7 | 40 | 15 | 9 | 13 | 9 | 11 | 5 | 17 |
| Ex. 8 | 4/7 | 60 | 10 | 7 | 9 | 7 | 7 | 9 | 13 |
| Ex. 9 | 5/7 | 60 | 7 | 6 | 17 | 14 | 15 | 9 | 9 |
| Ex. 10 | 6/7 | 40 | 18 | 17 | 15 | 8 | 7 | 15 | 13 |
| Ex. 11 | 4/7 | 66 | 9 | 5 | 10 | 10 | 8 | 6 | 6 |
| Ex. 12 | 7/7 | 40 | 12 | 10 | 10 | 15 | 11 | 11 | 11 |
| Ex. 13 | 6/7 | 55 | 10 | 8 | 6 | 9 | 9 | 14 | 16 |
| Ex. 14 | 6/7 | 50 | 5 | 13 | 12 | 12 | 8 | 9 | 9 |
| Ex. 15 | 7/7 | 50 | 11 | 16 | 8 | 10 | 13 | 11 | 9 |
| Ex. 16 | 5/7 | 60 | 9 | 10 | 8 | 9 | 17 | 6 | 7 |
| Ex. 17 | 6/7 | 60 | 15 | 13 | 5 | 16 | 10 | 10 | 9 |
| Ex. 18 | 7/7 | 35 | 15 | 11 | 21 | 10 | 18 | 17 | 16 |
| C. Ex. 1 | 3/7 | 80 | 5 | 6 | 8 | 6 | 5 | 10 | 10 |
| C. Ex. 2 | 2/7 | 80 | 7 | 7 | 7 | 10 | 12 | 6 | 5 |
| C. Ex. 3 | 6/7 | 75 | 10 | 9 | 6 | 12 | 12 | 8 | 8 |
| C. Ex. 4 | 0/7 | — | 0 | 0 | 0 | 0 | 0 | 0 | 0 |
| C. Ex. 5 | 4/7 | 70 | 9 | 5 | 13 | 9 | 10 | 7 | 7 |
| C. Ex. 6 | 4/7 | 70 | 7 | 9 | 6 | 7 | 10 | 11 | 10 |

As shown in Table 2, the alumina-based sintered bodies (Examples 1 to 18) having a theoretical density ratio of 95.0% or more, containing rare earth element (RE) component, Si component, and at least two Group 2 element (2A) components selected from the group consisting of Mg component, Ca component and Ba component, that is, Group 2 element (2A) component comprising Mg component, Ba component and other component other than those, specifically Ca component, the rare earth element (RE) component being dispersed so as to satisfy the above condition, were difficult to generate breakdown, and had high withstand voltage value of 71 kV/mm or more at 700° C., thus having excellent withstand voltage characteristics.

Furthermore, the alumina-based sintered bodies (Examples 1 to 17) comprising raw material compositions 1 to 6, 8, 9 and 11 to 15 in which the content of Ba component is from 0.1 mass % to 1.0 mass %, and the content of rare earth element (RE) component is from 0.2 mass % to 4.0 mass % have higher withstand voltage value of 76 kV/mm or more at 700° C., thus having further excellent withstand voltage characteristics.

The alumina-based sintered bodies (Examples 1 to 17) in which the rare earth element (RE) component is La component, Nd component and Sm component, and having crystal phase of RE-β-alumina structure have higher withstand voltage value of 80 kV/mm or more at 700° C., thus having further excellent withstand voltage characteristics.

Contrary to this, the alumina-based sintered bodies (Comparative Examples 1 and 2) in which the rare earth element (RE) component is contained but is not satisfied with the above condition, the alumina-based sintered body (Comparative Example 3) having a theoretical density ratio of less than 95.0%, and the alumina-based sintered body (Comparative Example 4) which does not contain the rare earth element (RE) component each had small withstand voltage values. Furthermore, the alumina-based sintered body (Comparative Example 5) which does not contain Group 2 element (2A) component and the alumina-based sintered body (Comparative Example 6) which contains only one Group 2 element (2A) component each have a theoretical density ratio of less than 95%, and the withstand voltage value was merely about 45 kV/mm.

TABLE 3

| | Average Particle Diameter (μm) | | | Number of Crystal Particles satisfying | RE-β-Alumina Crystal Phase | | | Strength at High Temperature |
|---|---|---|---|---|---|---|---|---|
| | $D_A(Al)$ | $D_A(RE)$ | $D_A(RE)/D_A(Al)$ | $D_E(RE)/D_A(Al) \geq 2$ | x | y | z | (MPa) |
| Ex. 5 | 1.55 | 4.00 | 2.6 | 0 | 1 | 13 | 19 | 320 |
| Ex. 6 | 4.50 | 0.90 | 0.2 | 1 | 0 | 11 | 18 | 315 |
| Ex. 7 | 3.55 | 0.71 | 0.2 | 0 | 2.3 | 16 | 27 | 306 |
| Ex. 12 | 2.30 | 2.99 | 1.3 | 0 | 0 | 11 | 18 | 317 |
| C. Ex. 1 | 1.20 | 4.08 | 3.4 | 4 | 1 | 13 | 19 | 238 |
| C. Ex. 2 | 2.20 | 9.46 | 4.3 | 6 | 3 | 17 | 30 | 197 |

As shown in Table 3, in the alumina-based sintered bodies of Examples 1 to 18 containing Mg component, Ba component and other one element component other than those, as the Group 2 element (2A) component, the alumina-based sintered bodies of Examples 5 to 7 and 12 in which RE-β-alumina crystal phase having La component as the rare earth element (RE) component is present and the RE-β-alumina crystal phase is satisfied with at least one of the conditions (1) and (2) each had high strength at high temperature.

Contrary to this, the alumina-based sintered bodies of Comparative Examples 1 and 2 in which RE-β-alumina crystal phase having La component as the rare earth element (RE) component is present but the RE-β-alumina crystal phase is not satisfied with the conditions (1) and (2) each had low strength at high temperature of about 238 MPa and about 197 MPa, respectively.

<Production of Spark Plug>

Using Ni-base alloy, a wire rod having a sectional size of 1.6 mm×2.7 mm was prepared as the grounding electrode 6 according to the ordinary method. The columnar inner member 8 comprising copper and the outer member 7 formed by the Ni-based alloy in a cup shape were prepared, respectively. The inner member 8 prepared was inserted in the outer member 7 prepared, and the center electrode 2 having a diameter of 4 mm comprising the inner member 8 and the outer member 7 was prepared by plastic processing such as extrusion processing. One end portion of the grounding electrode 6 was joined to an end surface of the metal shell 4 formed into given shape and size (particularly, nominal diameter of a screw portion is 10 mm) by plastic processing and rolling processing, with electric resistance welding. An insulator 3 constituted of the alumina-based sintered body was prepared in the same manner as in Examples 1 to 18. The insulator 3 is prepared by granulating raw material powder, molding the granulated powder into a molded article with isotactic press, passing through a grinding-shaping step which grinds and shapes the molded article before burning, and burning the molded article. The center electrode 2 was assembled to the insulator 3, and the insulator 3 was assembled to the metal shell 4 having the grounding electrode 6 joined thereto. The front end portion of the ground electrode 6 was bent to the center electrode 2 side, so that one end of the grounding electrode 6 faced the front end portion of the center electrode 2. Thus, a spark plug 1 was produced. The spark plug 1 thus produced had the same effect as in Table 2 and Table 3. Thus, the alumina-based sintered body is particularly preferred as a spark plug including the insulator 3 having small size and decreased thickness, and a material of the insulator 3 used in a spark plug for internal combustion engines having high power. The spark plug including the insulator 3 formed by the alumina-based sintered body was difficult to cause breakdown at high temperature of about 500 to 700° C. and exhibited higher withstand voltage characteristics even though the thickness of the insulator is decreased and the spark plug is used for internal combustion engines having high power. In Particular, each spark plug including the insulator 3 prepared in the same manner as in Examples 5 to 7 and 12 exhibited higher strength at high temperature in addition to the above characteristics.

The invention claimed is:

1. A spark plug comprising:
a center electrode;
a substantially cylindrical insulator provided on a periphery of the center electrode; and
a grounding electrode provided such that one end thereof faces the center electrode through a spark discharge gap,
wherein the insulator is formed by an alumina-based sintered body which has a theoretical density ratio of 95.0% or more, which contains a rare earth element (RE) component, Si component, and a Group 2 element (2A) component containing Mg and Ba as essential components and further containing at least other one element excluding Mg and Ba in Group 2 elements in a periodic table based on the recommendation of IUPAC 1990, and in which the rare earth element (RE) is dispersed so as to satisfy the condition described below:
when 7 places of measurement line, measurement length: 180 μm, are selected in the alumina-based sintered body and the rare earth element (RE) present in each of selected measurement lines is analyzed with an energy dispersion method, a total number of measurement lines in which 8 or more peaks derived from the rare earth element (RE) are observed is 4 places or more of the 7 places.

2. The spark plug according to claim 1, wherein when a whole mass of the alumina-based sintered body is defined as 100 mass %, the rare earth element (RE) component is contained in a content of 0.2 mass % to 4.0 mass %, and the Ba component is contained in a content of 0.1 mass % to 1.0 mass %.

3. The spark plug according to claim 1,
wherein the rare earth element (RE) component is at least one component selected from a group consisting of La component, Pr component, Nd component and Sm component, and
wherein the alumina-based sintered body has RE-β-alumina crystal phase containing at least the rare earth element (RE) component, and an average crystal particle diameter $D_A(RE)$ of the RE-β-alumina crystal phase and an average crystal particle diameter $D_A(Al)$ of alumina are satisfied with the following condition (1):

$$0.2 \leq D_A(RE)/D_A(Al) \leq 3.0 \qquad \text{Condition (1).}$$

4. The spark plug according to claim 1, wherein the rare earth element (RE) component is at least one component selected from a group consisting of La component, Pr component, Nd component and Sm component, and wherein the alumina-based sintered body has RE-β-alumina crystal phase containing at least the rare earth element (RE), and a number of RE-β-alumina crystal phases, of the RE-β-alumina crystal phases, in which its crystal particle diameter $D_E(RE)$ and an average crystal particle diameter $D_A(Al)$ of alumina are satisfied with the following condition (2) is 3 or less:

$$D_E(RE)/D_A(Al) \geqq 2 \qquad \text{Condition (2).}$$

5. The spark plug according-claim 3, wherein the RE-β-alumina crystal phase has a composition represented by a compositional formula:

$RE(2A)_x(Al)_yO_z$; wherein x, y and z are x=0 to 2.5, y=11 to 16, and z=18 to 28, respectively.

* * * * *